United States Patent [19]

Kumeth

[11] Patent Number: 4,744,456

[45] Date of Patent: May 17, 1988

[54] APPARATUS FOR THE ORIENTATED SUPPLY OF HELICAL SPRINGS TO A WORKING STATION

[76] Inventor: Siegmund Kumeth, Bayreuther Strasse 37, 8450 Amberg, Fed. Rep. of Germany

[21] Appl. No.: 879,896

[22] Filed: Jun. 30, 1986

[30] Foreign Application Priority Data

Jul. 17, 1985 [DE] Fed. Rep. of Germany ....... 3525463

[51] Int. Cl.$^4$ .............................................. B65G 47/24
[52] U.S. Cl. ..................................... 198/389; 198/953
[58] Field of Search ............... 198/388, 389, 406, 416, 198/637, 953

[56] References Cited

U.S. PATENT DOCUMENTS

| | | | |
|---|---|---|---|
| 4,091,915 | 5/1978 | Claasen .................................. | 198/389 |
| 4,148,389 | 4/1979 | Dixon ..................................... | 198/389 |
| 4,650,059 | 3/1987 | Fries ...................................... | 198/389 |
| 4,667,806 | 5/1987 | Kumeth ........................... | 198/953 X |

Primary Examiner—Stephen J. Novosad
Assistant Examiner—William P. Neuder
Attorney, Agent, or Firm—Lucas & Just

[57] ABSTRACT

The invention relates to an apparatus for the orientated supply of helical springs, which are provided on at least one end with an open loop, to a working station, having a first conveying device, to the end of which are supplied the springs resting with their spring bodies on a support surface of the first conveying device and with their longitudinal extension arranged in the conveying direction of the first conveying device, and having a second conveying device with its beginning adjoining the end of the first conveying device.

The invention is characterized in that the second conveying device comprises a guide strip, on which the springs transferred from the first conveying device to the second conveying device are held hanging downwards by their loop and which, at least in its area forming the beginning of the second conveying device, extends transversely to the conveying direction which the first conveying device has at its end, the area of the guide strip forming the beginning of the second conveying device is arranged opposite the end of the first conveying device but at a distance from the said end, and in the area forming the beginning of the second conveying device the guide strip has an overhung upper edge which is situated in approximately the same plane as the support surface for the spring bodies of the first conveying device.

8 Claims, 3 Drawing Sheets

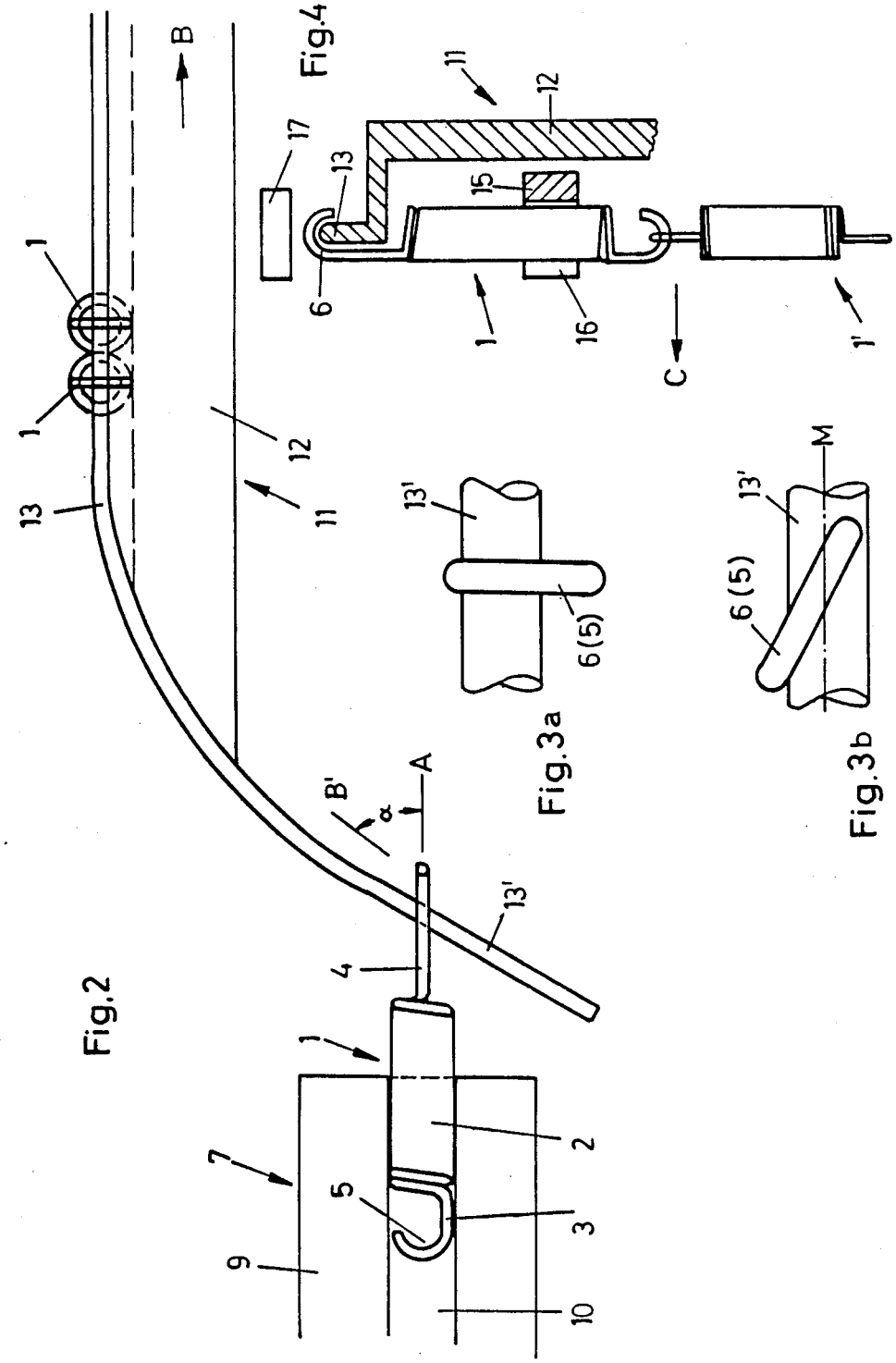

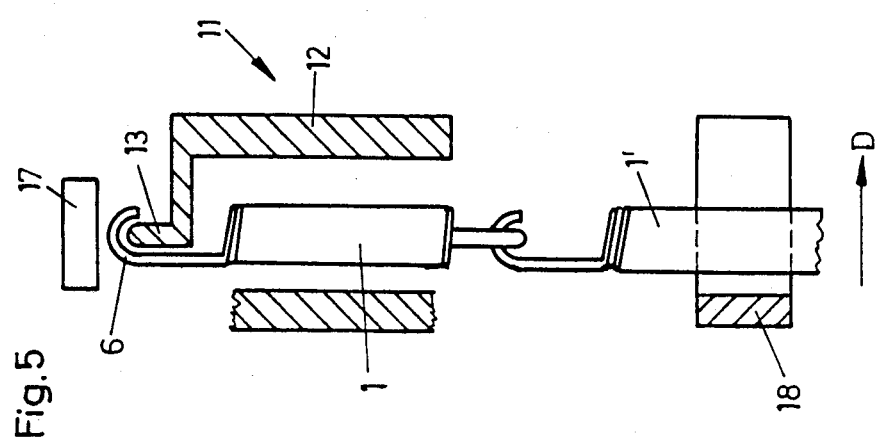
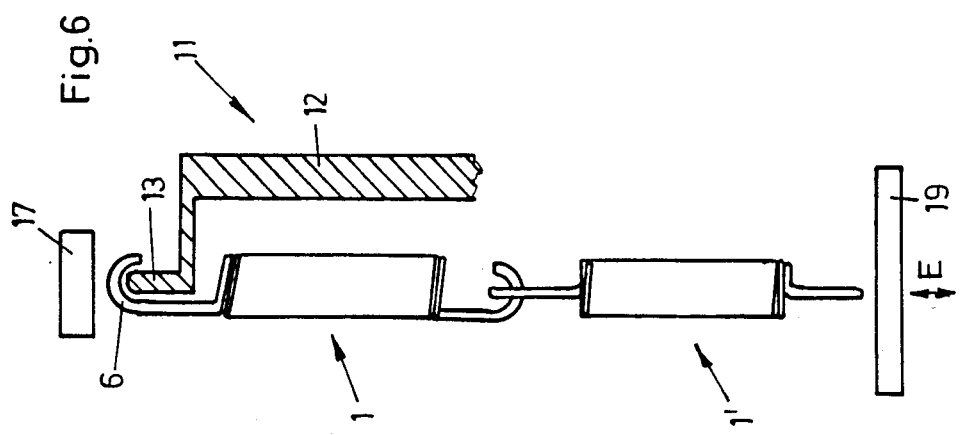

APPARATUS FOR THE ORIENTATED SUPPLY OF HELICAL SPRINGS TO A WORKING STATION

The invention relates to an apparatus according to the preamble of patent claim 1.

Helical springs or tension springs, which are also used in their special construction as "leg springs" and are provided on at least one end or leg with an open loop, are used very frequently in all fields of industry in the manufacture of components, apparatus etc. Even today the automatic processing and assembly of springs of this type still gives rise to considerable problems, and in particular when these springs are kept available for further processing at random in a store, i.e. in a feeding apparatus or device formed by a vibration tub for example. By means of a special design of the feeding device or of the guide tracks provided on the said feeding device it is possible in principle to orientate the springs in such a way that they are conveyed to an automatic assembly apparatus with their longitudinal extension lying in the conveying direction, it being also possible to ensure to a considerable extent by special means that only those springs which are not entangled in one another reach the automatic assembly apparatus. Hitherto, however, no apparatus have been commercially available which would permit a reliable orientation of helical springs or leg springs about the longitudinal extension of their spring bodies in such a way that all the springs conveyed to the working station of an automatic assembly apparatus each have a uniform orientation in accordance with the further processing or the assembly with respect to their loops or the hook-shaped angles forming the said loops, although it is ensured by the manufacture of the springs per se that the loops provided on the legs of each spring always have a precisely predetermined spatial coordination.

An apparatus for the separation and orientation of helical springs has already been proposed, in which on reaching the end of a first conveying device the springs disposed in a guide in the said first conveying device are turned in each case about their longitudinal extension in such a way with the aid of an ensiform element pivoting into the front loop (as viewed in the conveying direction) that each spring then faces upwards with the open side of the front loop, so that in the orientated state the individual springs can be transferred from the end of the first conveying device to a second conveying device constructed in the manner of tongs and can be passed on to a working station. This apparatus, however, is relatively complicated in design.

The object of the invention is to disclose an apparatus which with a particularly simple design permits an orientation or an orientated supply of helical springs, which are provided on at least one end with an opened loop, to a working station in a reliable manner.

In order to attain this object an apparatus is designed according to the characterizing part of patent claim 1.

In the case of the apparatus according to the invention the springs moved by way of the first conveying device to the end thereof are transferred to the second conveying device in such a way that each spring which has reached the end of the first conveying device is moved with part of its length to an increasing extent beyond the end of the first conveying device and is pushed with the open loop in front in the conveying direction beyond the area of the guide strip of the second conveying device forming the beginning of the said conveying device. When the spring finally projects freely so far beyond the end of the first conveying device that the center of gravity of this spring is also outside the support surface of the first conveying device, the spring has the tendency to tilt or fall downwards out of the first conveying device. If the loop in front in the conveying direction faces downwards with its open side or, on the other hand, has not been turned from this ideal position about its longitudinal axis by a predetermined angle, i.e. a position (hereinafter referred to as the "transfer position") permitting the transfer to the second conveying device, as it tilts downwards the spring is suspended with the open loop in front in the conveying direction on the guide strip of the second conveying device, so that springs are arranged on the guide strip of the second conveying device in a close sequence one after the other, each one held on an open loop and hanging vertically downwards from the guide strip, and in this way they have a uniform orientation in each case and can be supplied to a working station in the state orientated in this way. Those springs, which on reaching the end of the first conveying device are not in the transfer position, fall downwards after reaching the end of the first conveying device and are taken up for example by a collecting apparatus, from which they can then be returned to the store. By adjusting the distance between the end of the first conveying device and the beginning of the second conveying device, the apparatus can be set to process springs of different size.

In addition, it is also possible with the apparatus according to the invention for asymmetrical leg springs, i.e. leg springs which have legs of different length at their ends, to be orientated in such a way that the orientated leg springs on the second conveying device face upwards with their longer leg in each case for example.

Further developments of the invention form the subjects of the sub-claims.

The invention is explained in greater detail below by way of embodiments with reference to the Figures, in which FIG. 1 is a diagrammatic side view of an apparatus according to the invention;

FIG. 2 is a plan view of the apparatus according to FIG. 1;

FIGS. 3a and 3b are enlarged detailed side views of the beginning of the second conveying device of the apparatus according to claim 1, together with a leg spring conveyed to the end of the first conveying device, but in a different position of the said spring, and FIGS. 4 to 6 show different steps provided in the region of the second conveying device for detaching entangled leg springs.

Figure 1:
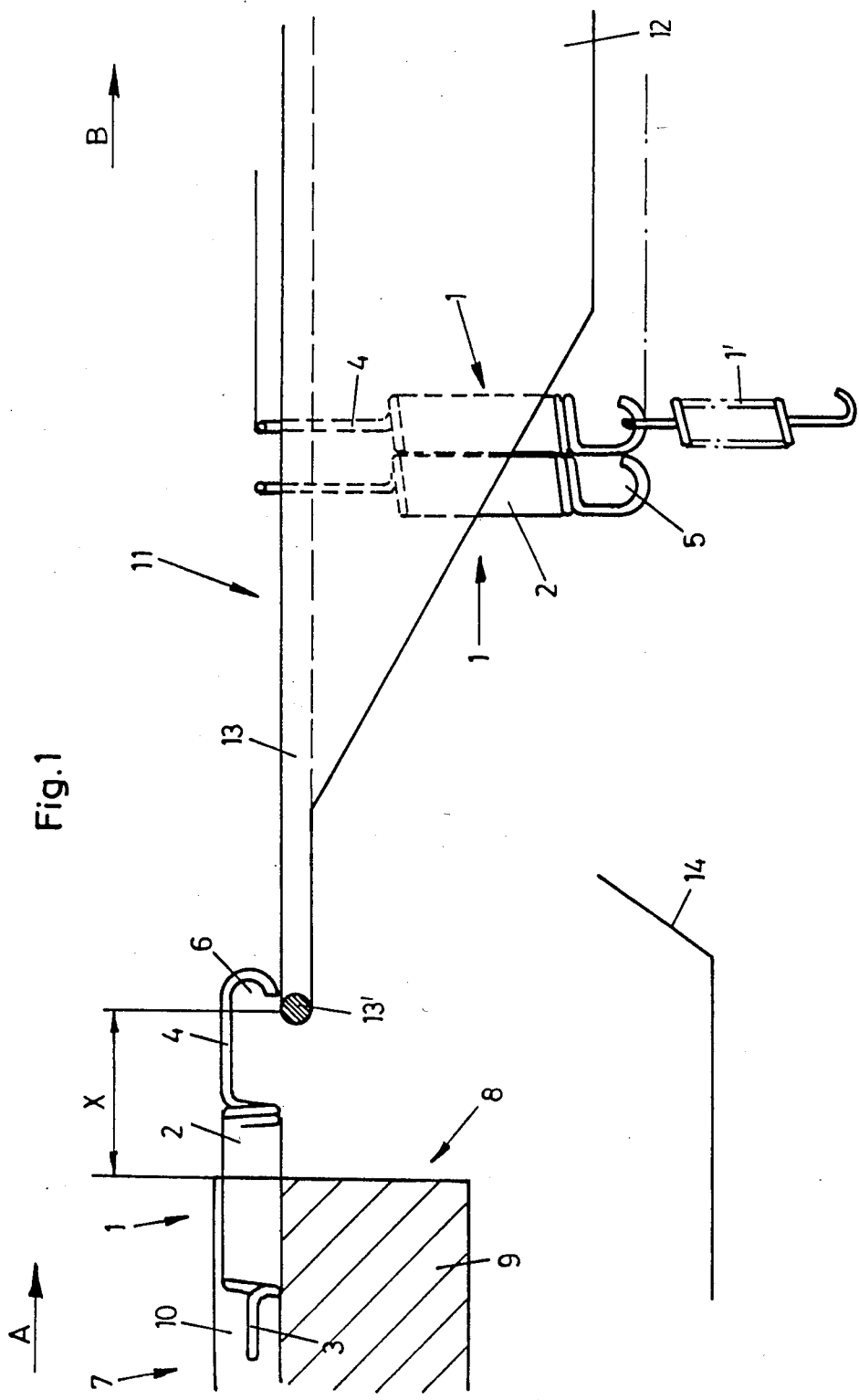

In the Figures, the reference numeral 1 designates helical springs formed as tension springs and produced in conventional manner from spring wire and constructed in the form of leg springs, each of which comprises a helical spring body 2 and at each end a leg 3 and 4 respectively, which extends in the longitudinal direction of the spring body 2 and each of which is bent over at its free end to form an open loop 5 and 6 respectively.

In the embodiment illustrated, since the leg 4 is of greater length in each case than the leg 3, the leg springs 1 can also be referred to as "asymmetrical leg springs".

In the case of the illustration selected for FIGS. 1 and 2 the leg springs 1 are conveyed from a spring store (e.g. a storage container, not shown in greater detail) by way of a first conveying device 7 from left to right to the right-hand end 8 of the said conveying device, corresponding to the conveying direction indicated by arrow A. In the case of the embodiment illustrated, the conveying device 7 is a vibration conveyor constructed as a linear conveyor (linear rail). Irrespective of the particular design of the conveying device 7, the leg springs 1 are conveyed to the end 8 in such a way that at least in the region of the said end they lie with their longitudinal extension in the conveying direction A of the conveying device 7. In the case of the embodiment illustrated, the conveying direction A extends in a horizontal direction, at least at the end 8.

The conveying device 7 essentially comprises a rail-like element 9 which is acted upon with the vibration or movement necessary for effecting the conveying action and which, in order to guide the leg springs 1, is provided on its top with a guide groove 10 which is open here and also at the end 8 and which is closed on the sides extending in the conveying direction A and at the base.

The end 8 of the conveying device 7 is followed by a further conveying device 11, which, in the case of the embodiment illustrated, is likewise constructed as a vibration conveyor and by means of which the leg springs, after their transfer and orientation explained in greater detail below, are conveyed, hanging on the open loop 6, i.e. arranged side by side with their longitudinal extension in a vertical direction, in the direction of the main conveying direction indicated by arrow B, i.e. in the case of the illustration selected for FIGS. 1 and 2, from left to right to a working station (not illustrated in these Figures) provided at the right-hand end of the conveying device 11.

In the case of the embodiment illustrated, the conveying device 11 again comprises a rail-like element 12 which is acted upon by a driving device (not shown in greater detail) with the vibration or vibratory movement required for effecting the conveying action. The upper edge of the rail-like element 12 is constructed as a guide strip 13 in such a way that the leg springs 1 can hang by their open loop 6 on the said guide strip 13 or are held hanging on the conveying device 11, i.e. with their longitudinal extension lying in the vertical direction.

As shown in FIG. 2 in particular, in the case of the embodiment illustrated, the guide strip extending in the horizontal direction extends beyond the end of the element 12 facing the conveying device 7 and with this projecting rod- or bar-like area 13', which is likewise situated in a horizontal plane, it forms a sort of threading mandrel on which the leg springs 1 conveyed to the end 8 of the conveying device 7 can hang with their open loop 6.

As further shown in FIG. 2 in particular, the area 13' is shaped in such a way that in its portion directly opposite the end 8 of the conveying device 7 it has in the conveying direction A a horizontal gap x which can be adjusted in size by moving at least one of the two conveying devices 7 and 11 respectively relative to the other conveying device.

In the embodiment illustrated, the area 13' of the guide strip 13 has a circular cross-section which is smaller than the opening of the loops, i.e. the loops 6, by which the leg springs 1 are to hang on the guide strip 13 or the area 13' thereof.

As shown in FIG. 1, the conveying device 11 is further arranged in such a way with respect to the conveying device 7 that the upper edge of the guide strip 13 or of the area 13' of the said guide strip is situated at approximately the same level as, or preferably slightly lower than, the base surface of the guide groove 10, on which the leg springs 1 conveyed on the end 8 of the conveying device 7 rest with their spring bodies 2.

The mode of operation of the apparatus illustrated can be described as follows:

In the conveying device 7 or during the transfer to the said conveying device the leg springs 1 are already orientated to the extent that each leg spring 1 conveyed to the end 8 of the conveying device 7 lies with its longitudinal extension in the conveying direction (arrow A), but in other respects the leg springs 1 conveyed to the end 8 have a random orientation, i.e. in some of the leg springs 1 conveyed to the end 8 the longer leg 4 is in front in the conveying direction and in others of the leg springs 1 the shorter leg 3 is in front in the conveying direction. Apart from this the leg springs 1 conveyed to the end 8 also have a random rotational position with respect to their longitudinal axis, i.e. the open end of the loop lying in front in the conveying direction faces upwards in the vertical direction in the case of some of the leg springs 1, and faces downwards in some, as shown in FIG. 1 as the ideal transfer position, and in others it faces to one or other side in the horizontal direction, any intermediate position also being possible.

It is now intended by means of the apparatus illustrated to transfer the leg springs 1 to the conveying device 11 in such a way that with the loops 6 held on the guide strip 13 they hang down from the latter in the vertical direction, so that all the leg springs 1 on the conveying device 11 necessarily have the same orientation, i.e. are orientated in the same direction and can be transferred in this state to the working station following after the conveying device 11.

For this purpose the distance x is set in such a way that it is greater than the distance between the shorter leg 3 of the uniformly designed leg springs 1 from the center of gravity of the said springs in each case, but is less than the distance between the longer leg 4 and the said center of gravity. The center of gravity of the leg springs 1 is approximately in the center of the spring body 1.

In this way, only those leg springs 1, which are moved forward by way of the conveying device 7 and the longer legs 4 of which are in front in the conveying direction, at the open end 8 of the conveying device 7 or the guide groove 10 can finally in principle project so far beyond the said end that the loop 6 has moved past or off the area 13' of the guide strip 13 before the leg spring 1 projecting beyond the end 8 can tilt downwards from the guide groove 10 with its front end during a further movement in the conveying direction A, i.e. when the center of gravity moves past the end 8. In other words, those leg springs 1, which move forward with their longer leg 4 beyond the end 8 of the conveying device 7 and in which the opening of the loop 6 faces downwards, remain with the loop 6 hanging on the area 13' of the guide strip 13 of the conveying device 11 and are conveyed in this state first in the direction of arrow B' and subsequently in the conveying direction B to the working station. Since the area 13' has a cross-section which is smaller than the diameter of the opening of the loop 6, even those leg springs 1 in which the leg 4 is in front in the conveying direction remain hanging in the area 13', but the open side of the loop 6 does not face exactly vertically downwards but the plane of the loop 6 is inclined with respect to the vertical, and do not yet occupy the transfer position.

Those leg springs 1, which lead with their leg 4 and in which the plane of the loop 6 beyond the transfer position is inclined with respect to the vertical or in which the open side of this loop faces in particular upwards or obliquely upwards, cannot remain hanging on the area 13' or be transferred from the conveying device 7 to the conveying device 11 in the manner described, but, like all the leg springs 1 which reach the end 8 of the conveying device 7 with their shorter leg 3, drop onto a collecting apparatus 14 provided below the area 13' or below the end 8 and are returned to the store for the leg springs 1 for example by way of a conveying device not shown in greater detail.

Since the conveying device 11 is constructed as a vibration conveyor, i.e. the element 12 of this device executes a vibratory movement or reciprocating movement in accordance with the conveying direction B (main conveying direction) which extends parallel to the conveying direction A of the conveying device 7, it is essential in the case of the embodiment illustrated that the portion of the area 13' facing the end 8 should extend obliquely to the conveying direction A in such a way that the conveying direction A and the conveying direction B' of the area 13' form an acute angle a, i.e. an angle less than 90°, with one another, which faces towards the side of the area 13' remote from the conveying device 7, so as to avoid an accumulation of springs during the transfer or to ensure that after the transfer to the area 13' the leg springs 1 are removed thence in the direction B' without delay.

The apparatus described can of course also be used for the orientated supply of symmetrical leg springs 1 to a working station, i.e. for orientating leg springs whose legs 3 and 4 are of equal length. In this case the orientation of the leg springs conveyed to the end 8 of the conveying device 7 in the axial direction is then no longer important, i.e. all the leg springs 1 are transferred to the area 13' or cam be suspended there by one of their open loops 5 or 6 respectively which occupy the transfer position.

It is to be understood that the distance x can be adjusted as a function of the size of the leg springs 1 or as a function of the length of the spring body 2 and of the legs 3 and 4 respectively in such a way that as many as possible of the springs moved forward by way of the conveying direction 7 are transferred to the conveying device 11 in the desired orientation or remain hanging on the guide strip 13 in the manner described.

It is further apparent from FIGS. 3a and 3b that a transfer of the leg springs 1 from the conveying device 7 to the conveying device 11 is possible not only with the open loop end facing vertically downwards (FIG. 3a) but also with the loop oblique (FIG. 3b), when for example, with asymmetrical leg springs 1, the loop 6 is inclined only to the extent that with its open end it can engage behind the area 13' having a circular cross-section (in the first moment of transfer) still below the horizontal median plane M of the said area. This means that the maximum inclination of the loop 6, at which a transfer is still possible, is essentially also dependent upon the cross-section of the area 13'.

Since it is not possible to prevent leg springs 1 which are hooked together at their ends from being transferred from the conveying device 7 to the conveying device 11, so that an additional leg spring 1' is then suspended on the lower loop 5 of individual leg springs 1 hanging on the guide strip 13, further means are provided in the region of the conveying device 11 in order to remove the leg springs 1' hanging on the loops 5.

When the loops 5 are suitably orientated with respect to the loops 6, according to FIG. 4 these means can consist for example in that during their movement along the conveying device 11 the leg springs 1 are pivoted laterally about the loop 6 suspended on the guide strip 13 in accordance with arrow C in FIG. 4 to the extent that the leg springs 1' possibly hanging on the lower loop 5 are released and drop off. The pivoting of the leg springs 1 hanging down from the guide strip 13 is made possible by the fact that the springs run onto a guide strip 16 which extends over part of the length of the conveying device 11 and which is either part of the element 12 or an additional structural element and comprises a guide surface 16 which is at an increasing lateral distance in the conveying direction B from a vertical plane embracing the guide strip 13. In order to prevent the leg springs 1 from becoming unhooked from the guide strip 13 during their pivoting, a securing strip 17, which extends at least over that region of the conveying path 11 in which the pivoting of the leg springs 1 takes place, is provided above the said guide strip 13 and at a slight distance from the upper edge of the said strip.

In accordance with FIG. 5 it is also possible in principle, in order to remove the suspended leg springs 1', for the latter to be provided with a guide element 18 which acts in a manner corresponding to the guide element 15, but pivots the suspended leg springs 1' so far to the side in accordance with arrow D that the leg springs 1' are released from the leg springs 1 suspended on the guide strip 13.

A third possibility is illustrated in FIG. 6. In this case an ejector 19, which is plate-shaped for example, is provided below part of the area of the conveying path of the conveying device 11, and, while using a suitable drive, executes a movement directed upwards and downwards (double arrow E), where appropriate in conjunction with an additional lateral movement and comes to bear with its upper side against the lower ends of the suspended leg springs 1' and thereby release the latter from the leg springs 1 which are guided on the guide strip 13 and which here too are prevented from being detached from the guide strip 13 by the securing strip 17.

A fourth possibility is that spring (1') is blown away or blown off of spring (1) by means of compressed air.

I claim:

1. An apparatus for the orientated supply of helical springs, which are provided on at least one end with an open loop, to a working station, said apparatus comprising: a first conveying device having a guide groove (10) for the springs (1), said guide groove (10) extending in conveying direction (A) of the first conveying device (7) and being open at one end of the first conveying device (7) and forming a resting surface for the springs (1), with said springs (1) being arranged in said guide groove (10) and on said resting surface such that said spring (1) extends longitudinally in the conveying direction (A) of the first conveying device (7) and said spring (1) being supplied to said one end of the first conveying device by said device, a second conveying device (11) having a beginning adjoining said one end of the first conveying device, said second conveying device (11) comprising a guide strip (13), on which the springs (1) are transferred from the first conveying device (7) to the second conveying device (11) such that said spring (1) is held hanging downward by loop (5, 6) of said spring (1), said guide strip (13) having an area (13') forming said beginning of the second conveying device (11) and extending transversely to the conveying direction (A) which the first conveying device (7) has at its end, said one end of the first conveying device (7) being arranged opposite to said area (13') of said guide strip (13) and in conveying direction (A) of the first conveying device (7) at a distance (x) from and before said area (13') of the guide strip, with the guide strip (13) having in said area (13') an overhung upper edge, said area (13') situated in approximately the same plane as said resting surface of a first conveying device.

2. An apparatus according to claim 1, characterized in that the guide strip (13) extends in a horizontal plane at least in its area (13') forming the beginning of the second conveying device (11).

3. An apparatus according to claim 1, characterized in that the guide strip extends obliquely to the conveying direction (A) of the first conveying device (7) at least in its area (13') forming the beginning of the second conveying device (11).

4. An apparatus according to claim 1, characterized in that the first conveying device (7) and/or the second conveying device (11) is a linear conveyor, preferably in the form of a vibration conveyor.

5. An apparatus according to claim 1, characterized in that the guide strip (13) is made bar- or rod-shaped in its area (13') forming the beginning of the second conveying device (11).

6. An apparatus according to claim 1, characterized in that the first conveying device (7) comprises a guide, preferably a guide groove (10), open at the end (8) of the said conveying device.

7. An apparatus according to claim 1, characterized by means (15, 18, 19) on the second conveying device (11) for mechanically removing hooked springs (1') or for blowing away hooked springs (1') by means of compressed air.

8. An apparatus according to claim 1, characterized in that the distance (x) between the end the first conveying device (7) and the beginning of the second conveying device (11) is adjustable.

* * * * *